United States Patent
Beckwith

(10) Patent No.: US 7,027,452 B2
(45) Date of Patent: Apr. 11, 2006

(54) HUB WHICH CONVERTS SCADA PROTOCOLS TO THE BLUJAY™ PROTOCOL

(76) Inventor: Robert W. Beckwith, 2784 Camden Rd., Clearwater, FL (US) 33759

( * ) Notice: Subject to any disclaimer, the term of this patent is extended or adjusted under 35 U.S.C. 154(b) by 88 days.

(21) Appl. No.: 10/850,744

(22) Filed: May 22, 2004

(65) Prior Publication Data

US 2004/0213263 A1    Oct. 28, 2004

Related U.S. Application Data

(63) Continuation-in-part of application No. 10/405,558, filed on Apr. 2, 2003, now abandoned, which is a continuation-in-part of application No. 10/074,110, filed on Feb. 11, 2002, now abandoned, which is a continuation-in-part of application No. 09/479,650, filed on Jan. 8, 2000, now Pat. No. 6,766,143.

(60) Provisional application No. 60/116,984, filed on Jan. 25, 1999.

(51) Int. Cl.
*H04L 12/28* (2006.01)
*H04J 3/16* (2006.01)

(52) U.S. Cl. .................................. 370/407; 370/466
(58) Field of Classification Search .................. None
See application file for complete search history.

(56) References Cited

U.S. PATENT DOCUMENTS

| 5,490,134 | A * | 2/1996 | Fernandes et al. ........... 370/466 |
| 5,517,646 | A * | 5/1996 | Piccirillo et al. ............... 713/1 |
| 5,621,727 | A * | 4/1997 | Vaudreuil .................... 370/401 |
| 6,052,053 | A * | 4/2000 | Jubin et al. .................. 340/540 |
| 6,393,588 | B1 * | 5/2002 | Hsu et al. ...................... 714/43 |
| 6,415,337 | B1 * | 7/2002 | Chung ............................ 710/8 |
| 2001/0047441 | A1 * | 11/2001 | Robertson ..................... 710/65 |
| 2001/0055954 | A1 * | 12/2001 | Cheng ........................ 455/74.1 |
| 2002/0154629 | A1 * | 10/2002 | Lohman et al. ............. 370/386 |

* cited by examiner

*Primary Examiner*—Duc Ho
*Assistant Examiner*—Phuongchau Ba Nguyen
(74) *Attorney, Agent, or Firm*—Leo J. Aubel

(57) ABSTRACT

A wireless hub uses a first processor to communicate with IEDs, uses a second processor to communicate with landline SCADA devices, and uses a third processor to extract, store and exchange messages between SCADA protocols and IED data formats so as to as to permit two way communications between SCADA users and IEDs which are independent of protocol data formats and time of exchange.

1 Claim, 2 Drawing Sheets

HUB WHICH CONVERTS SCADA PROTOCOLS TO THE BLUJAY™ PROTOCOL

This application is a continuation in part of application Ser. No. 10/405,558 titled A WIRELESS COMMUNICATIONS HUB WITH PROTOCOL CONVERSION filed for Robert W. Beckwith on Apr. 2, 2003 now abandoned which was a continuation in part of application Ser. No. 10/074,110 titled A WIRELESS COMMUNICATIONS HUB WITH PROTOCOL CONVERSION filed for Robert W. Beckwith on Feb. 11, 2002 now abandoned which was a continuation in part of application Ser. No. 09/479,650 titled "EXPANDED CAPABILITIES FOR WIRELESS TWO-WAY PACKET COMMUNICATIONS FOR IEDs" filed by Robert W. Beckwith on Jan. 8, 2000 now U.S. Pat. No. 6,766,143 which claimed the priority date of provisional patent application Ser. No. 60/116,984 filed by Robert W. Beckwith on Jan. 25, 1999 titled "RADIO AS THE MAN/MACHINE INTERFACE FOR AN IED". The title has been changed.

REFERENCES

The IEEE 100 dictionary of IEEE standards terms, seventh edition defines the following terms which are used herein:

1. "intelligent electronic device (IED) Any device incorporating one or more processors with the capability to receive or send data/control from or to an external source."
2. "supervisory control (1) (supervisory control, data acquisition, and automatic control) An arrangement for operator control and supervision of remotely located apparatus using multiplexing techniques over a relatively small number of interconnecting channels.

A form of remote control of remotely located units by electrical means over one or more common interconnecting channels."

Definition of words as used herein:
1. "bit-stream": any serial string of binary bits in time sequence.
2. "message": the bits within a bit-stream that have been assigned a meaning.
3. "data format": the information required to code and decode messages.
4. "memory format" the information required to place data within an electronic memory and to find data once placed in memory.
5. "routing": the bits within a bit stream that direct messages in a bidirectional path between two points within a communications network.
6. "DSSS: Direct Sequence Spread Spectrum" The message signal in DSSS transmission is "spread" at baseband and then modulated to the operating frequency (such as the ISM band from 2.4 GHz to 2.4835 GHZ as used by the Beckwith Electric Company M-2901 BLUJAY™ wireless transmitter/receivers). When received the signal is first demodulated to the baseband frequencies and then "despread" to recover the message.
7. "DSSS BPP: Base Band Processor" The Prism II DSSS BBP chip used in BLUJAY™ products sends messages many times at frequencies as high as 11 gigabits per seconds. Various signal failure avoidance techniques are used in repeated transmissions to provide a very high probability that the message components will be received error free each millisecond of message time flow. For that reason BLUJAY™ products use a one megabit per second bit stream transmission rate. An efficient message routing data format ie protocol provides a BLUJAY™ message transmission rate of 0.5 megabits per second.
8. A "protocol" consists of a detailed method of combining messages and routings to form a bidirectional digital communications path between two points.
9. "legacy IEDs" a properly operating IED which is not equipped to communicate in various present day SCADA protocols.

PRIOR ART

U.S. Pat. No. 5,621,727 by Vaudreuil is an example of network messaging systems using hubs. The Vaudreuil patent will be used herein to describe the differences between the present inventive hub and the network messaging systems of Vaudreuil.

Beckwith Electric company (BECO) manufactures M-2901 BLUJAY™ wireless transmitter/receivers. BLUJAY™ devices are used to provide license free bidirectional wireless digital communications between two points. BLUJAY™ devices make no attempt to avoid data crashes other than that described above under "definitions" as provided by Intersil Prism II chip sets used in the M-2901 devices. The M-2901 does not comply with IEEE standard 802.11.

It has been demonstrated that BLUJAY™ devices are capable of error free communications with no interference with or by other wireless products in general use in the Industrial, Scientific and Medical (ISM) band. This band is from 2.4 GHz to 2.4835 GHZ as set aside in the USA for unlicensed use of DSSS technology.

Wireless BLUJAY™ bit-streams flow at one megabit per second rates. Continuous two way digital communications at 0.5 megabit per second message rates is provided.

SUMMARY OF THE INVENTION

Unlike the hubs described in the Vandreuil patent referenced above, the inventive hub disclosed herein is for the special purpose of providing SCADA communications to a human operator who has continuous responsibility for the operation of installations such as electric power substations and generating plants. The SCADA communications may use of any one of a variety of protocols in general use.

Wireless communications is provided to legacy IEDs within installations such as electric power substations and generating plants by Beckwith Electric BLUJAY™ wireless transmitter/receivers. Protocol conversion is provided between any protocol of an operators' choice to the protocol of BLUJAY™ wireless devices used to read information in each IED memory format.

Messages are held for any required length of time by the inventive hub 115. Messages are exchanged between the hub 115 and the IEDs at rates and times as are fitting to the practical operation of the IEDs. These rates may be as high as 0.5 megabits per second.

Operator commands are communicated through the hub to any selected IED within a few tenths of a second. Failure of an IED to communicate is taken as an IED failure and a failure report is generated and sent to the operator.

The inventive hub uses one processor acting as a full computer for message storage for each IED, for protocol conversion as required between the BLUJAY™ wireless communications devices and SCADA communications devices and for time buffering of any length required by the operator. For example, historic IED data for a month can be held if required.

Two communications processors are provided, one for BLUJAY™ wireless communications with IEDs and a second for SCADA communications with an operator.

A user interface port is provided for IED data entry, hub program entry and maintenance communications with the three processors.

The foregoing features and advantages of the present invention will be apparent from the following more particular description of the invention. The accompanying drawings, listed herein below, are useful in explaining the invention.

DETAILED DESCRIPTION OF THE PREFERRED EMBODIMENTS

The term "SCADA" (for Supervisory Control And Data Acquisition) is used herein to refer to practice as described in reference 2.

The term "IED" is used herein to refer to devices within electric utility substations or within industrial complexes which are under operators control using SCADA practices. It is the BLUJAY™ and only the BLUJAY™ protocol that is used to communicate with IEDs by the inventive hub 115 of the present invention.

Remarks contained herein concerning BLUJAY™ products and protocols are for information only so as to serve as a limitation for the hub 115 capability in communicating with legacy IEDs.

Figure 1:
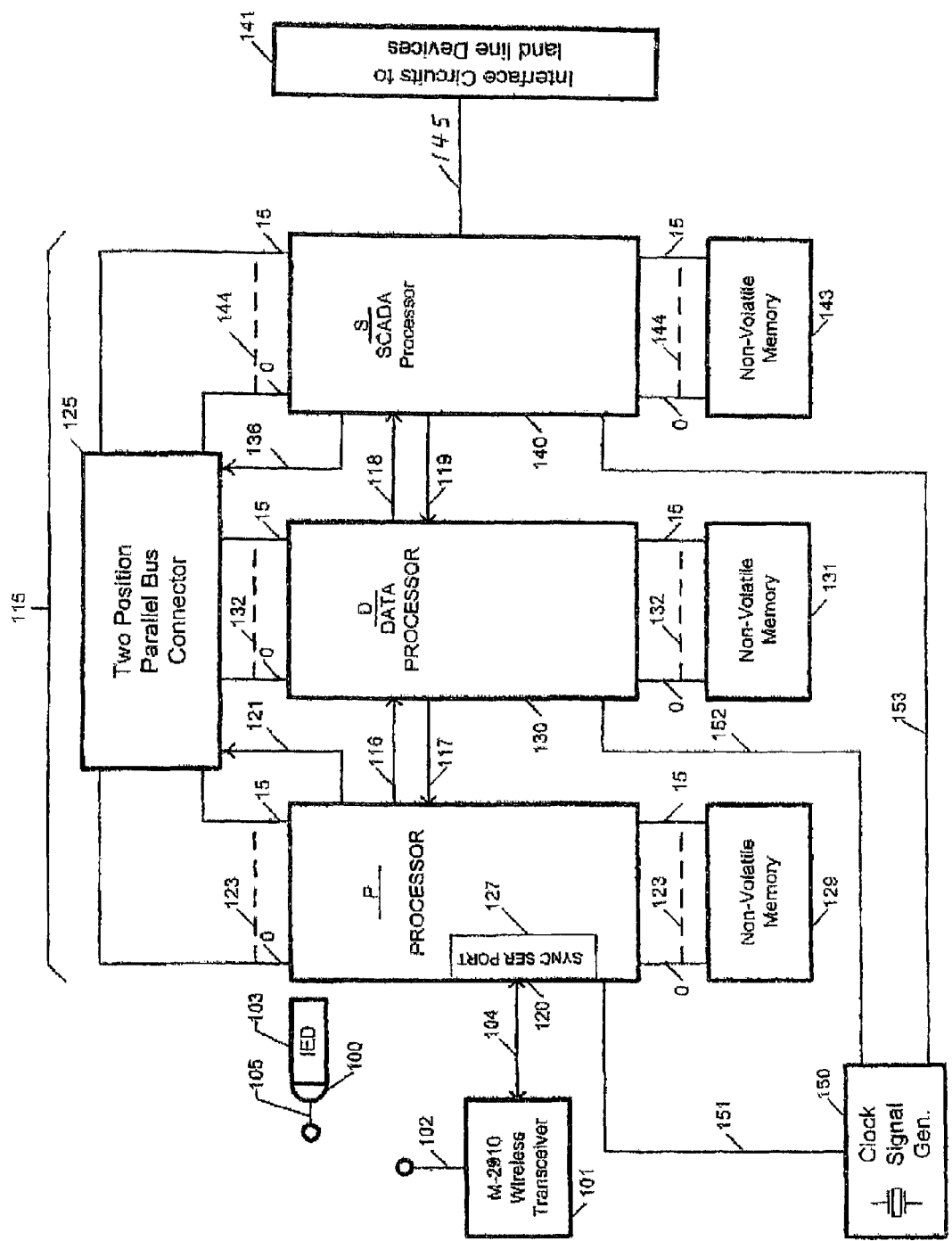
FIG. 1 A block diagram of the inventive hub communicating with an IEDs and with a SCADA user.

FIG. 1 shows a block diagram of the inventive hub 115. D processors 130 run continuously using programs for managing data files of information concerning each IED 103 served by hubs 115.

Processors P 120 have 32 bit busses 123, D 130 have 32 bit busses 132 and S 140 have 32 bit busses 144. These are each partitioned with first 16 buss bits 0 through 15 used for parallel data transfer via Two Position Parallel Bus Connector (TPPBC) 125. Processors P 120 have Non-Volatile Memory 129, D 130 have Non-Volatile Memory 131 and S 140 have Non-Volatile Memory 143. These non-volatile memories are accessed by the associated processors using the second 16 buss bits 0 through 15.

Using the BLUEJAY™ protocol BECO model M-2910 BLUEJAY™ wireless transceivers 101 using antennae 102 communicate with typical IEDs 103. IEDs 103 communicate via BLUEJAY™ devices 100 having antennae 105. Devices 100 may be BECO model M-2910 or selectively may be other BECO BLUEJAY™ devices best suited for particular IEDs.

Clock signal generator 150 provides synchronous clock signals on line 151 to processors P 120, on line 152 to processors D 130 and on line 153 to processors S 140.

Wireless transceivers 101 communicate with P processors 120 via two way serial interconnection 104 and synchronous serial port 127. P processors 120 exchange data with D processors 130 by parallel transfer through two position parallel bus connectors 125. Data is sent to and received from IEDs using the BLUEJAY™ protocol.

P processors 120 buffer data for purposes of matching data speeds with wireless transceivers 101, for effecting parallel transfers of data with D processors and if necessary to wait for SCADA communications to end. Direction of parallel transfers is established by enabling line 116 for flow from processor P 120 to processor D 130. Enabling line 117 establishes data transfer from D processor 130 to P processor 120. Once a direction is enabled, transfer in the other direction is blocked.

S processors 140 provide communications for human operators of electric utility substations or industrial complexes using SCADA practice. Hub 115 provides SCADA communications over circuits 145 connecting via dedicated interface circuits 141 to land line devices used by the SCADA users.

Generally SCADA circuits use a dedicated communications network connected between more than one SCADA user.

Several SCADA protocols of common choice may be held in S processor memory 143. If not, a SCADA protocol can be added by the hub user via the hub user interface computer 200 as described under FIG. 2.

S processor 140 communicates via parallel bus connector 125 to D processor 130. Connector 125 is two position and can connect S processor 140 to D processor 130 or P processor 120 to D processor 130. Lines 118 and 119 select the direction of communications between S processor 140 and D processor 130 and operate by the first direction chosen blocking the other direction. Line 136 enables communications between S 140 and D 130 processors and line 121 enables communications between P 120 and D 130 processors. Again operation is on the basis of the first pair of processors enabled blocking the other. Processor S 140 does not communicate with processor P 120.

First 16 lines 0 through 15 on each of 32 bit parallel busses 123, 132 and 144 are used for parallel communications via Two Position Parallel Bus Connectors 125. Second 16 lines 0 through 15 on each of 32 bit parallel busses 123, 132 and 144 are used for memory management by the respective processors P 120, D 130 and S 140.

Again, processors S provide buffering for matching SCADA device data rates, for providing parallel bus communications and if necessary for waiting for P 120 to D 130 communications to end.

Processors D 130 and S 140 use multitask programming. The parallel data transfer is programmed in assembly language and takes place well within the time of one task. Data crashes are avoided by alternating assignment of parallel data transfers to tasks of a multitask program.

Processor D 130 contains a first field of memory format information for each IED served by hub 115. This information is that required to convert messages from each IED to a generic form. Selectively this is a binary form identifying such things as:

1. the IED,
2. the data type, ie Volts, watts, current, VArs etc
3. scaling factors In addition processor D 130 contains a second field of converted information from the generic form into the message format form used in the S 140 processor as required by the SCADA protocol of choice.

Figure 2:
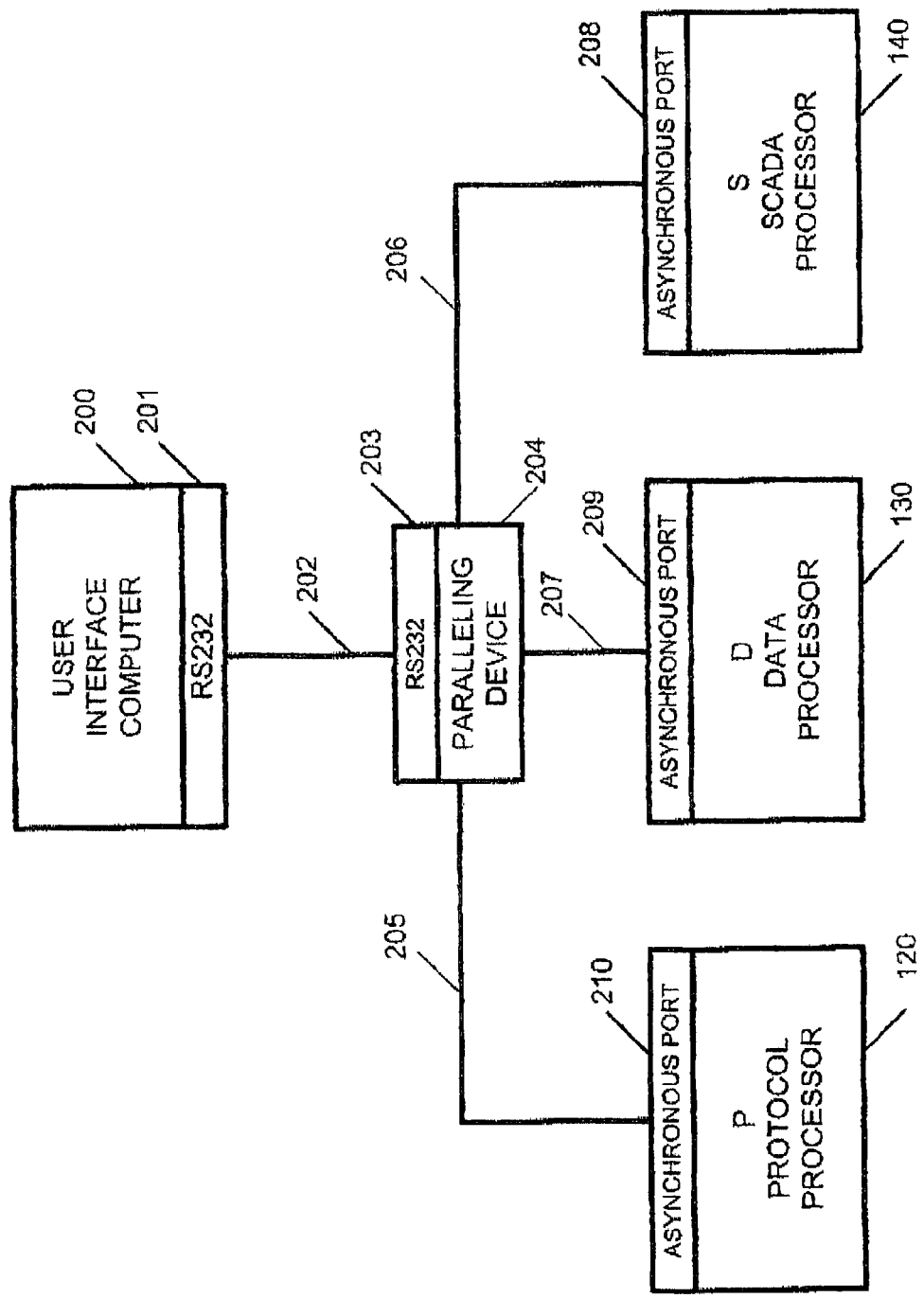
FIG. 2 The connections of a hub user interface computer to the hub.

FIG. 2 shows a user interface computer 200 using a program known as "HUBCOM". When needed, interface computer 200 can be interconnected with the hub 115 by use of cable 202. One end of cable 202 is inserted into RS232 port 201 on computer 200 with the other end connected to RS232 port 203 on RS232 paralleling device 204 located within Hub 115. The RS232 paralleling device 204 connects to asynchronous port 210 on P processor 120 via connection 205, to asynchronous port 209 on D processor 130 via connection 207 and to asynchronous port 208 on S processor 140 via connection 206.

The hub user will select and activate the SCADA program protocol of choice if contained in non-volatile memory 143 of the S processor 140. If not available the hub user may enter a SCADA protocol of choice.

The hub user can enter memory format and set point information for each IED which in general is expected to differ one from another.

The hub user may read IED data stored in the D processor and may communicate with the IEDs in a manner imitating a SCADA user.

User interface computer 200 is also used for other maintenance checking of hubs 115.

ADVANTAGES OF THE INVENTION

A. Provides SCADA communications to legacy IEDs served by Beckwith Electric BLUEJAY™ wireless devices.

B. Stores information including individual IED memory format and setpoint settings as required for proper scaling of data.

C. Takes the cost of ethernet out of IEDs.

D. Eliminates costs of physical data handling lines within substations and industrial plants.

E. Low cost as compared to competitive wired hubs.

While the invention has been particularly shown and described with reference to preferred embodiments thereof, it will be understood by those skilled in the art that various changes in form and details may be made therein without departing from the spirit and scope of the invention.

The invention claimed is:

1. A hub device providing communications between SCADA users having protocols of choice and legacy IEDs using BLUJAY™ wireless protocol comprising in combination:
   a) first processor means for using BLUJAY™ wireless transceivers for exchanging IED messages in legacy IED memory format with said hub,
   b) second processor means for exchanging SCADA user messages in data format in bit streams using SCADA users protocols of choice,
   c) third processor means in said hub for two way converting messages held in IED memory format and messages held in bit stream data formats as required for said SCADA users protocols of choice,
   d) digital communications means for two way communicating IED messages between said first and said third processors, and
   e) digital communications means for two way communicating SCADA messages between said second and said third processors whereby SCADA users can communicate via a hub with legacy IEDs,
   f) two position parallel bus connection device means for selectively providing parallel communications between said first and third processors or between said second and third processors,
   g) connection means for connecting said first processor and a first input of said two position parallel bus connection device,
   h) connection means for connecting said second processor and a second input to said two position parallel bus connection device,
   i) connection means for connecting said third processor means and a common input to said two position parallel bus connection device,
   j) binary control connection means for connecting between said first processors and said two position parallel bus connection device,
   k) binary control connection means for connecting between said second processor and said two position parallel bus connection device,
   l) program means for each said first and second processors for switching the direction of said two position parallel bus connection device, and
   m) further program means for said third processor choosing between communications with said first processor and communications with said second processor whereby digital bit streams are exchanged at high speeds using parallel bus connections.

* * * * *